(12) United States Patent  
Jones

(10) Patent No.: US 6,218,647 B1
(45) Date of Patent: *Apr. 17, 2001

(54) METHOD AND APPARATUS FOR USING DIRECT CURRENT TO DETECT GROUND FAULTS IN A SHIELDED HEATER WIRE

(75) Inventor: Thaddeus M. Jones, Bremen, IN (US)

(73) Assignee: MSX, Inc., South Bend, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/321,285

(22) Filed: May 27, 1999

Related U.S. Application Data

(63) Continuation-in-part of application No. 09/008,770, filed on Jan. 19, 1998.

(51) Int. Cl.[7] .............. H05B 1/02; H05B 3/44; H02H 3/00
(52) U.S. Cl. .......... 219/501; 219/213; 219/544; 219/549; 338/214; 361/42
(58) Field of Search .................. 219/501, 544, 219/213, 203, 481, 497, 528, 549; 338/214; 361/42, 43

(56) References Cited

U.S. PATENT DOCUMENTS

| 3,750,177 | 7/1973 | Rooks | 343/109 |
|---|---|---|---|
| 4,370,692 | * 1/1983 | Wellman, Jr. et al. | 361/109 |
| 4,520,417 | * 5/1985 | Frank | 361/45 |
| 4,725,717 | * 2/1988 | Harrison | 219/528 |
| 5,103,365 | 4/1992 | Uchida et al. | 361/42 |
| 5,420,740 | 5/1995 | MacKenzie et al. | 361/45 |
| 5,591,365 | * 1/1997 | Shields | 219/213 |
| 5,617,107 | 4/1997 | Fleming | 343/704 |
| 5,710,408 | * 1/1998 | Jones | 219/481 |
| 5,729,238 | 3/1998 | Walton, Jr. | 343/704 |
| 5,751,530 | 5/1998 | Pelly et al. | 361/56 |
| 5,861,855 | 1/1999 | Arsenault et al. | 343/704 |
| 6,084,207 | * 7/2000 | Jones | 219/213 |
| 6,107,611 | * 8/2000 | Jones | 219/509 |

FOREIGN PATENT DOCUMENTS

| 3713963 | * 11/1988 | (DE) . |
|---|---|---|
| 3735977 | * 5/1989 | (DE) . |
| 9011532 | * 10/1990 | (WO) . |

* cited by examiner

Primary Examiner—Sang Paik
(74) Attorney, Agent, or Firm—Taylor & Aust, P.C.

(57) ABSTRACT

An ice and snow melting system includes at least one sensor configured for sensing a temperature or moisture associated with an ambient environment and providing a signal indicative thereof. A heater for melting the ice and snow includes a heater wire, a layer of insulation substantially surrounding the heater wire, and a conductive shield substantially surrounding the layer of insulation. A ground fault circuit interrupter is coupled with the shield of the heater. The ground fault circuit interrupter detects a ground fault condition between the heater wire and the conductive shield and provides a signal indicative thereof. An automatic controller is connected to the at least one sensor. The controller includes heater control circuitry receiving each of the sensor signal and the ground fault circuit interrupter signal. The heater control circuitry selectively controls operation of the heater dependent upon the sensor signal and the ground fault circuit interrupter signal.

19 Claims, 4 Drawing Sheets

METHOD AND APPARATUS FOR USING DIRECT CURRENT TO DETECT GROUND FAULTS IN A SHIELDED HEATER WIRE

This is a continuation-in-part of U.S. patent application Ser. No. 09/008,770, entitled "METHOD AND APPARATUS FOR USING DIRECT CURRENT TO DETECT GROUND FAULTS IN A SHIELDED HEATER WIRE", filed Jan. 19, 1998.

BACKGROUND OF THE INVENTION

1. Field of the Invention

The present invention relates to the detection of ground faults, and, more particularly, to the detection of ground faults in electric heaters used to melt and thus remove snow and ice from pavement, roofs, gutters, down spouts, satellite dishes and the like.

2. Description of the Related Art

Electric heaters may be utilized to supply heat used in snow and ice melting systems. Typical melting applications include but are not limited to satellite dishes, roofs and gutters, pavement, building and garage entrances and facilities accommodating the physically challenged. Efficient operation requires embedding the electric heaters in or attaching the electric heaters to satellite dishes, pavement and other structures which may sometimes become covered with snow and ice.

Heater cable construction may employ one of several methods. For example, self-limiting heaters typically consist of two parallel stranded copper bus wires separated by a semiconducting polymer enclosed in one or more concentric layers of organic insulating material. Other common heater cable construction methods involve extruding a thermoplastic insulating compound over a single conductor or a pair of parallel conductors. Another construction method, the oldest, involves packing mineral insulation, commonly magnesium oxide, over a single conductor or a pair of parallel conductors enclosed within a copper or stainless steel tube. Current practice as dictated by the U.S. National Electric Code requires covering the heating cable with a grounded conductive copper braid or shield that serves as a return path for any ground current. Mineral insulated heaters accomplish this requirement by way of their outer stainless steel or copper tubular jackets.

Ground current is the difference between the outbound and return heater currents. The U.S. National Electric Code requires using a ground fault circuit interrupter (GFCI) on all snow and ice melting circuits. The GFCI interrupts heater current if the ground current exceeds a predetermined limit; usually 30 milliamperes. The GFCI requires manual reset after tripping. This preserves safety by not restarting heater operation during intermittent ground leakage current that may occur in wet locations.

Independent of the heater fabrication method, ground current can flow due to a heater failure caused by a manufacturing defect, corrosion, wear and tear or mechanical damage. Excessive ground current causes the dual safety problems of fire and shock hazard.

The fire hazard is variously referred to as a wet fire or heater burn-back. Although this can occur with heaters of any construction, it is more likely to occur in heaters with parallel conductors in the presence of moisture. Conductors exposed to the ambient due to mechanical damage are the starting point for the fire hazard. Moisture acting as an electrolyte on the cable in the area of the damage forms a conductive path between parallel conductors or between a conductor and a surrounding shield. Current flows through a small area and strikes an arc which creates a high temperature plasma. This carbonizes a portion of the polymer insulation and creates a conductive carbon arc track in the polymer. Flames and high temperatures occurring during the burn-back can ignite combustible materials in proximity to the heating cable. The burn-back mechanism in mineral insulated cable is similar except that magnesium hydroxide forms by mixing moisture with the magnesium oxide insulation to form a conductive electrolyte.

Aside from the fire hazard described above, an electrical shock hazard can also occur whenever ground current flows since its path to earth ground is usually not predictable. Thus, a GFCI is required to be incorporated into snow and ice melting electrical circuits.

Snow and ice melting systems commonly employ automatic controls that operate heaters only while required to minimize energy consumption and operating costs. Typically, the automatic controls sense ambient moisture and temperature. Heaters operate at ambient temperatures below a threshold—usually 38° F. while ambient moisture is present and for a period of time thereafter to clear accumulated snow and ice. Optionally, the automatic control may inhibit heater operation at temperatures too low for effective melting, e.g., below 17° F.

Current practice is to use a GFCI circuit breaker external to the automatic control of the snow and ice melting system. Such a self-contained GFCI circuit does not provide an output signal indicative of a ground fault condition. The automatic control may or may not require an external contactor for controlling heater operation.

It is also known from U.S. Pat. No. 5,710,408, assigned to the Assignee of the present invention, to sense a ground fault condition by inductively measuring both the current flowing into the heating element and the current flowing out of the heating element. Any difference between these two current levels represents ground leakage current. If the ground leakage current exceeds a preset value, then a ground current interface sends a signal to a microcontroller. The microcontroller may shut down power to or otherwise control the heater based upon this signal.

SUMMARY OF THE INVENTION

The present invention relates to a method for automatically controlling snow and ice melting electric heaters while continuously monitoring the ground leakage current in the shield surrounding the heater wire. In addition to the alternating current (AC) power voltage which heats the heater wire, a constant or direct current (DC) voltage, referred to herein as a tracer signal, is applied to the heater wire. Upon detecting the tracer signal in the shield, indicating a ground leakage current, the automatic controller interrupts electrical power provided to the heater until reset by operating personnel. Thus, the present invention combines the GFCI function with the automatic controller associated with the snow melting heaters. The automatic controller performs these tasks within norms established by the U.S. National Electrical Code and the testing requirements established by Underwriters' Laboratories.

The invention comprises, in one form thereof, an ice and snow melting system including at least one sensor configured for sensing a temperature or moisture associated with an ambient environment and providing a signal indicative thereof. A heater for melting the ice and snow includes a heater wire, a layer of insulation substantially surrounding the heater wire, and a conductive shield substantially surrounding the layer of insulation. A ground fault circuit interrupter is coupled with the shield of the heater. The ground fault circuit interrupter detects a ground fault condition between the heater wire and the conductive shield and provides a signal indicative thereof. An automatic controller is connected to the at least one sensor. The controller includes heater control circuitry receiving each of the sensor signal and the ground fault circuit interrupter signal. The heater control circuitry selectively controls operation of the heater dependent upon the sensor signal and the ground fault circuit interrupter signal.

An advantage of the present invention is that the automatic control and GFCI functions are combined together into a single automatic controller, thereby reducing installation cost and complexity.

Another advantage is that by combining the automatic control and GFCI functions, an automatic controller costing less than individual GFCI and automatic snow and ice melting controls is realized.

Yet another advantage is that the direct current signal introduced into the heater wire can be easily monitored in the shield, thereby eliminating the circuitry that is needed to detect an AC voltage in either the heater wire or the shield.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
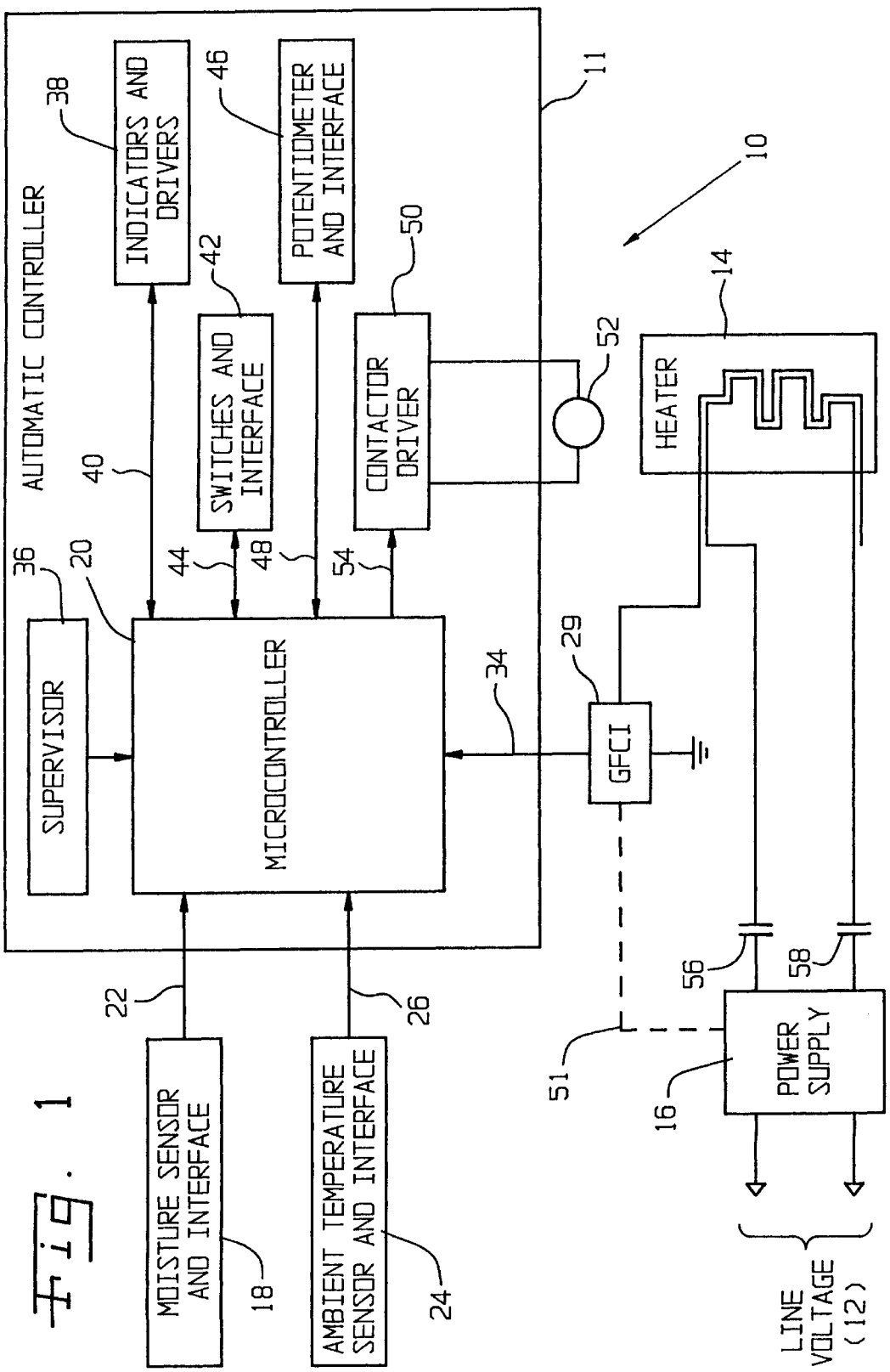
FIG. 1 is a schematic illustration of an embodiment of the overall snow and ice system of the present invention, showing each of the subsystems and their interconnections.

Referring now to the drawings and particularly to FIG. 1, there is shown an overall view of an embodiment of a snow and ice melting system 10 of the present invention. Snow and ice system 10 generally includes an automatic controller 11, heater 14, power supply 16, moisture sensor and interface 18, ambient temperature sensor and interface 24 and ground fault circuit interface 29.

Unless otherwise noted, details familiar to persons skilled in the electronic arts will be omitted since they are extraneous detail and thus have no bearing on reducing the invention to practice. Where in this application the terms "control", "controlling" or the like are used, it is to be understood that such terms may include the meaning of the terms "regulate", "regulating", etc. That is, such "control" may or may not include a feedback loop. Moreover, it is also to be understood, and it will be appreciated by those skilled in the art, that the methodology and logic of the present invention described herein may be carried out using any number of structural configurations such as electronic hardware, software, and/or firmware, or the like.

A line voltage 12 supplies power to system 10 including heaters 14. Power supply 16 derives its power from the line voltage 12 and supplies all circuits with appropriate AC and DC operating voltages.

Automatic controller 11, in the embodiment shown, is constructed as an integral unit which includes a number of separate subsystems or modules. In the particular embodiment shown in FIG. 1, controller 11 includes an electrical processor or microcontroller 20, supervisor 36, indicators and drivers 38, switches and interface 42, potentiometer and interface 46, and contactor driver 50. Such modules or subsystems are preferably incorporated into a single housing, shown schematically in FIG. 1. However, it will also be appreciated that any of the individual subsystems or modules making up automatic controller 11 may also be separate or remotely located from automatic controller 11, if desirable for a particular application.

The moisture sensor and interface 18 uses an on-board temperature regulated heater to convert snow and/or ice to liquid water. Water on the surface of a sensing grid is detected as a change in conductivity. An interface circuit incorporated within moisture sensor and interface 18 converts the conductivity change into a low-impedance analog signal which is transmitted to an electrical processor such as a microcontroller 20 via conductor 22.

The ambient temperature sensor and interface 24 converts the ambient temperature sensor signal into an analog signal which is appropriate for inputting to the microcontroller 20 via a conductor 26.

In the embodiment of ice and snow melting system 10 shown in the drawings, moisture sensor and interface 18 and ambient temperature sensor and interface 24 are shown as separate subsystems. However, it is also possible to combine moisture sensor and interface 18 and ambient temperature sensor and interface 24 into a single subsystem. An example of a single sensor which may combine the moisture sensing and ambient temperature sensing into a single unit is known, e.g., from a model CIT-1 Snow Sensor and a model GIT-1 Gutter Ice Sensor, each of which are manufactured by the Assignee of the present invention.

Figure 2:
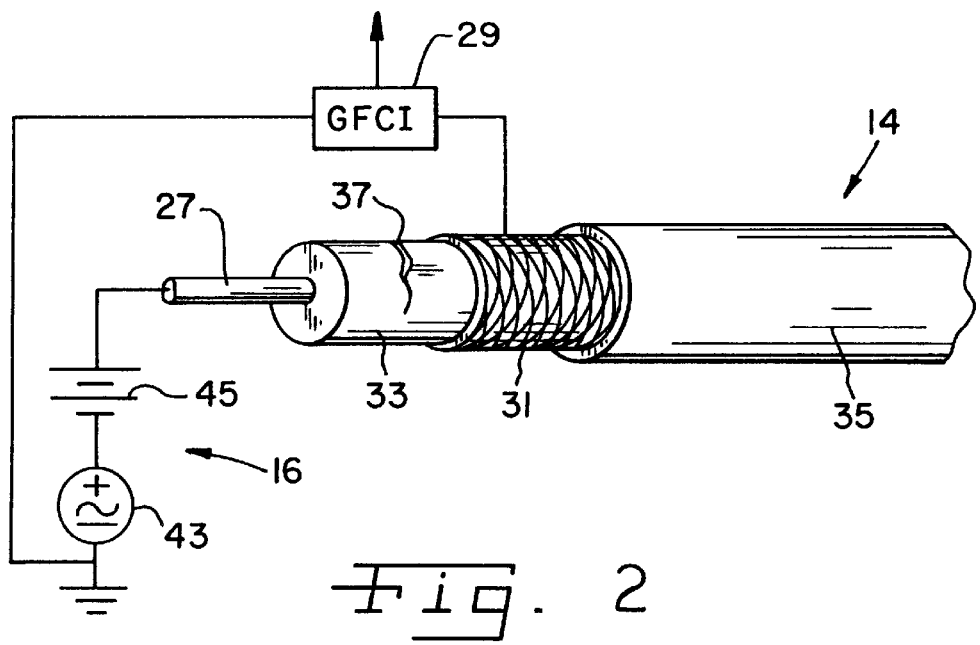
FIG. 2 is a sectional, perspective view of one embodiment of a heater cable of the present invention and the associated ground fault circuit interrupter.

Heater 14, shown in more detail in FIG. 2, includes a heater wire 27 surrounded by an electrically conductive heater shield 31. Power supply 16 provides current to heater wire 27 which acts as a resistive heating element. Heater shield 31 is electrically insulated from heater wire 27 by a layer of insulation 33 which surrounds heater wire 27. In the embodiment shown, heater shield 31 is surrounded by a layer of extruded polyvinylchloride plastic insulation 35.

It is possible for an ohmic contact to be established between heater wire 27 and heater shield 31 in the event that heater 14 is damaged or the integrity of layer of insulation 33 is otherwise compromised. This can occur if an air gap forms between heater wire 27 and heater shield 31, such as through a crack 37 in insulation 33. Arcing in the air gap between heater wire 27 and heater shield 31 can create a carbonized track or ohmic contact through which current can leak from heater wire 27 to heater shield 31. Although heater shield 31 can be grounded in order to carry away such ground leakage current, it is clearly not desirable for melting system 10 to continue to operate with ground leakage current between heater wire 27 and heater shield 31. The present invention monitors heater shield 31 and shuts down power to or otherwise controls heater 14 when ground leakage current in heater shield 31 is detected.

Power supply 16, in the embodiment shown, energizes heater 14 with both an alternating current voltage 39 (FIG. 3) and a direct current voltage 41 provided by AC voltage supply 43 and DC voltage supply 45, respectively. AC voltage 39 sources substantially all of the energy used to heat heater wire 27. DC voltage 41 is more easily detectable than an AC signal, and thus is used by the present invention to trace ground leakage current from heater wire 27 to heater shield 31, as will be described in more detail hereinafter. In the event that a ground fault occurs between heater wire 27 and heater shield 31 through the above-described ohmic contact, both AC voltage 39 and DC voltage 41 leak into heater shield 31.

Figure 4:
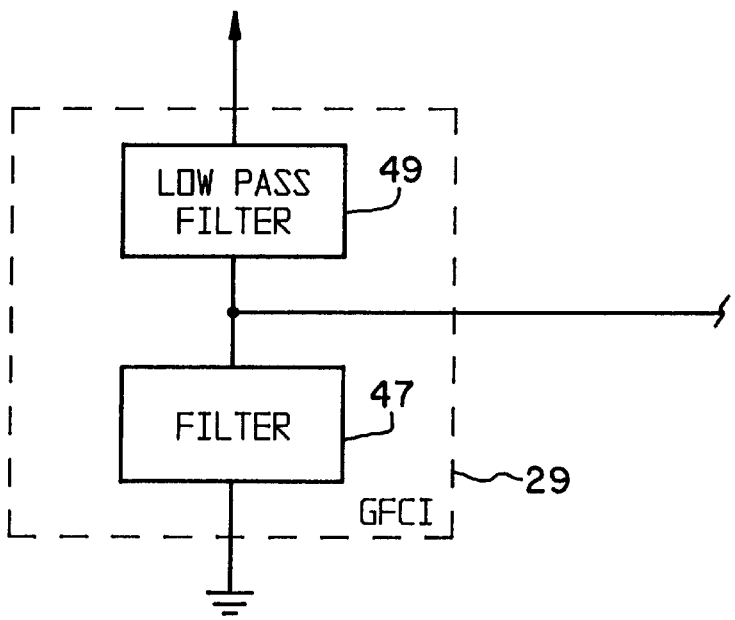
FIG. 4 is a block diagram of one embodiment of the ground fault circuit interrupter of the overall snow and ice system of FIG. 1.

The ground fault circuit interrupter 29 converts any ground leakage current in heater shield 31 into a signal appropriate for inputting to the microcontroller 20 via conductor 34. Referring now to the embodiment shown in FIG. 4, ground fault circuit interrupter 29 includes a filter 47 which allows alternating current from AC voltage 39 in heater shield 31 to pass to ground. Ground fault circuit interrupter also includes a low pass filter 49 which allows DC voltage 41 in heater shield 31 to pass to microcontroller 20 of automatic controller 11. Microcontroller 20 thereby senses the presence of DC voltage 41 in heater shield 31, which presence indicates that ground current is leaking from heater wire 27 to heater shield 31. Upon sensing DC voltage 41, microcontroller 20 instructs contactor driver 50 to shut off power to heater 14. In this way, DC voltage 41 functions as a tracer signal to indicate the presence of the less easily detectable power AC voltage in heater shield 31.

DC voltage 41 can be set to a level such that, after factoring in voltage drops along heater wire 27, layer of insulation 33, heater shield 31 and low pass filter 49, an appropriate DC voltage, e.g. 5 volts, is input to microcontroller 20. In some applications, however, it may be desirable for ground fault interrupter 29 to include circuitry (not shown) between low pass filter 49 and microcontroller 20 for sensing a DC voltage above some threshold value. The threshold value may be substantially less or greater than a voltage level appropriate for inputting to microcontroller 20. The circuitry, upon sensing a DC voltage in heater shield 31 above the threshold voltage, would send a signal to microcontroller 20, the signal having a voltage level compatible therewith. The signal would indicate that ground current is leaking from heater wire 27 to heater shield 31 and that power to heater 14 should be shut off. The circuitry could include one or more comparators. Rather than inputting a signal to microcontroller 20, it is also possible for the circuitry to send a signal directly to power supply 16, as indicated by dotted line 51 in FIG. 1, shutting off power to heater 14 in the event that ground fault leakage current is sensed.

Figure 3:
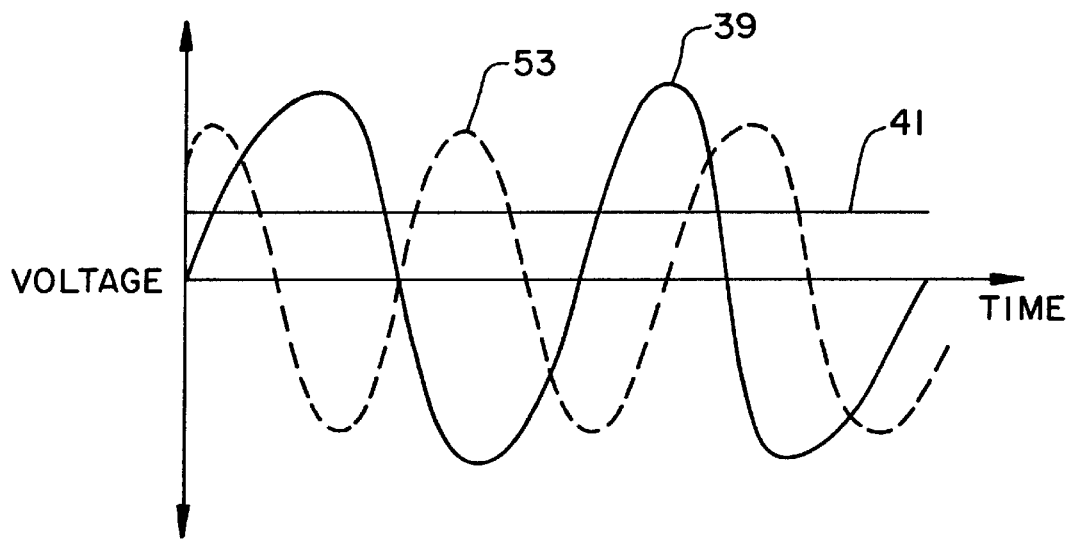
FIG. 3 is a plot of one embodiment of voltage signals provided by the power supply of the overall snow and ice system of FIG. 1.

In an alternative embodiment, instead of a DC voltage, another AC voltage waveform can act as the tracer signal for power AC voltage 39. Such an AC voltage tracer signal is shown in FIG. 3 as the dotted waveform 53. AC tracer signal voltage 53 has a lower amplitude and a different frequency than power AC voltage 39. Although AC voltage tracer signal 53 is shown as having a particular amplitude and frequency, it is also possible for tracer signal 53 to have a different amplitude and frequency than as shown. For example, tracer signal 53 can have the same frequency as power AC voltage 39 but be out of phase therewith.

Snow and ice melting system 10 is particularly suited for use with a heater on a non-conductive substrate, such as an antenna. Such a non-conductive substrate would not electrically interfere with voltages on either heater wire 27 or heater shield 31.

The supervisor 36 controls the restarting of microcontroller 20 upon the initial application of power and under brown-out conditions. Supervisor 36 holds the microcontroller 20 in its reset condition so long as its supply voltage is too low to permit reliable operation. Supervisor 36 asserts reset until the supply voltage has been reliable long enough for the microcontroller 20 to initialize itself.

The microcontroller 20 in combination with its firmware form the primary subsystem of snow and ice melting system 10. Microcontroller 20 provides one time programmable program memory, data memory, program alterable permanent memory (i.e., electrically erasable read only memory (EEROM), an 8-bit analog to digital (A/D) converter, timers, counter, a fail-safe (i.e., watch dog) timer and digital inputs and outputs. If the fail-safe timer is not reset frequently enough, it restarts the microcontroller 20. This prevents microcontroller 20 from latching due to electrical transients from lighting and similar causes. An example of a microcontroller which has been found suitable for use within automatic controller 11 is a PIC16C84 manufactured by Microchip Corporation, Chandler, Ariz.

The indicators and drivers 38 provide status information for operating personnel. Typical status information includes but is not limited to the presence of electric power, snow, operation of heater 14 and a ground fault condition. In the particular embodiment shown, the indicators are visible light emitting diodes (LED's), and the associated drivers consist of bipolar or metal oxide field effect transistors used as saturating power amplifiers for the low power microcontroller 20 outputs received over conductor(s) 40. However, some microcontrollers have sufficient current capacity to drive the LED's directly.

The switches and interface 42 provides an interface between operating personnel and the automatic snow and ice melting control. Switches and interface 42 is connected to microcontroller 20 via conductors 44. Switch functions include but are not limited to test/reset of the GFCI, testing of heater 14, cycle heater 14 and abort heater operation. Typically, the interface consists of a pull-up resistor for each active switch contact.

The potentiometer and interface 46 converts a potentiometer shaft azimuth into a proportional analog signal for input via conductor(s) 48 to an analog to digital (A/D) converter associated with microcontroller 20. Since the particular microcontroller 20 described with reference to FIG. 1 includes an A/D converter, interface circuitry is not required. Counter-clockwise potentiometer terminals are grounded and clockwise terminals are connected to the A/D converter reference voltage—typically the positive supply voltage for microcontroller 20. The potentiometer's wiper is connected directly to an A/D converter input. If the microcontroller used does not provide the analog to digital converter function, the potentiometer shaft position can be directly inputted to a digital input through the use of a resistor-capacitor network and a digital output using techniques well known to persons skilled in the electronic arts.

Depending upon the application, it may take several hours for the system to heat to ice melting temperature, thus causing an accumulation of snow and ice. Removing the accumulation requires heater operation for a period of time after precipitation stops. Automatic controls usually provide an adjustable hold-on timer for this purpose. An analog potentiometer associated with potentiometer and interface 46 provides a calibrated hold-on time adjustment.

The contactor driver 50 is a saturated power amplifier employing either a bipolar or metal oxide field effect transistor to drive the solenoid coil of a contactor 52. Microcontroller 20 output port(s) 54, in the particular embodiment shown, lack the voltage and current capacity to do this directly. Contactor 52 provides two normally open contacts that control power applied to the heater 14. More particularly, contactor 52 is connected to one side of respective relays including relay contacts 56, 58. Thus, microcontroller 20 and contactor driver 50 define heater control circuitry within automatic controller 11 for selectively controlled operation of heater 14, through contactor 52 and relay contacts 56, 58. The U.S. National Electrical Code requires breaking both line leads of 208/240/480 volt circuits. Only the line side and not the neutral side of the power line needs to be broken in 120/277 volt circuits.

As apparent from the foregoing description, the present invention combines the functions of automatic snow and ice melting control with ground fault circuit interruption. Automatic controller 11 causes melting by operating control contactor 52 to close relay contacts 56 and 58 thus applying the line voltage 12 to heater 14. Operation continues while moisture is present and the ambient temperature is in the operating range and for the hold-on time thereafter.

Operationally, the GFCI function has a higher priority than of automatic control. That is, unless a ground fault current occurs, controller 11 performs an automatic snow and ice melting control function. Upon detecting a ground current above a threshold value, the invention terminates its automatic control function and acts as a GFCI. Once tripped, operating personnel must operate a reset switch to cancel GFCI operation even though power may have been removed from the automatic controller. An indicator displays GFCI operation.

In addition to the normal control functions of automatic controller 11, operation of an override switch forming a part of switches and interface 42 causes heaters 14 to operate for the hold-on time independent of environmental conditions. This permits clearing tracked snow in doorways and parking garage entrances that go undetected by the sensor. Another switch permits testing heaters for a brief interval. This permits nondestructive heater testing during the summer months.

It is possible for ground leakage current to enter heater 14 from other parts of ice and snow melting system 10 or from an external source. In another embodiment (not shown) heater 14 is electrically isolated or can be isolated in order to determine whether a ground fault is in heater 14 or originates in some other source.

Figure 5:
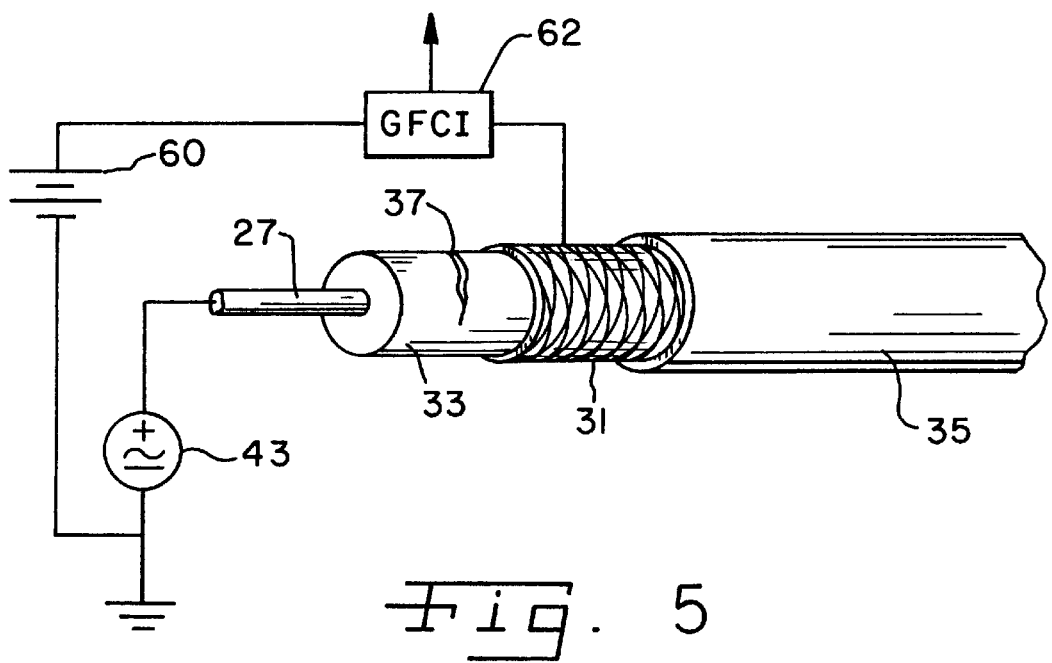
FIG. 5 is a sectional, perspective view of another embodiment of a heater cable and an associated ground fault circuit interrupter of the present invention.

In another embodiment (FIG. 5), a DC voltage supply is not applied to heater wire 27, but rather a DC voltage supply 60 is applied to heater shield 31 through GFCI 62. In this embodiment, heater shield 31 is not grounded, and, consequently, no current will flow through heater shield 31 in the absence of a ground fault condition, even though a DC voltage is being applied to heater shield 31. If a ground fault does occur, however, DC current may flow from heater shield 31 to heater wire 27. GFCI 62 then senses the DC current in heater shield 31 and transmits a signal to microcontroller 20 indicative thereof.

Figure 6:
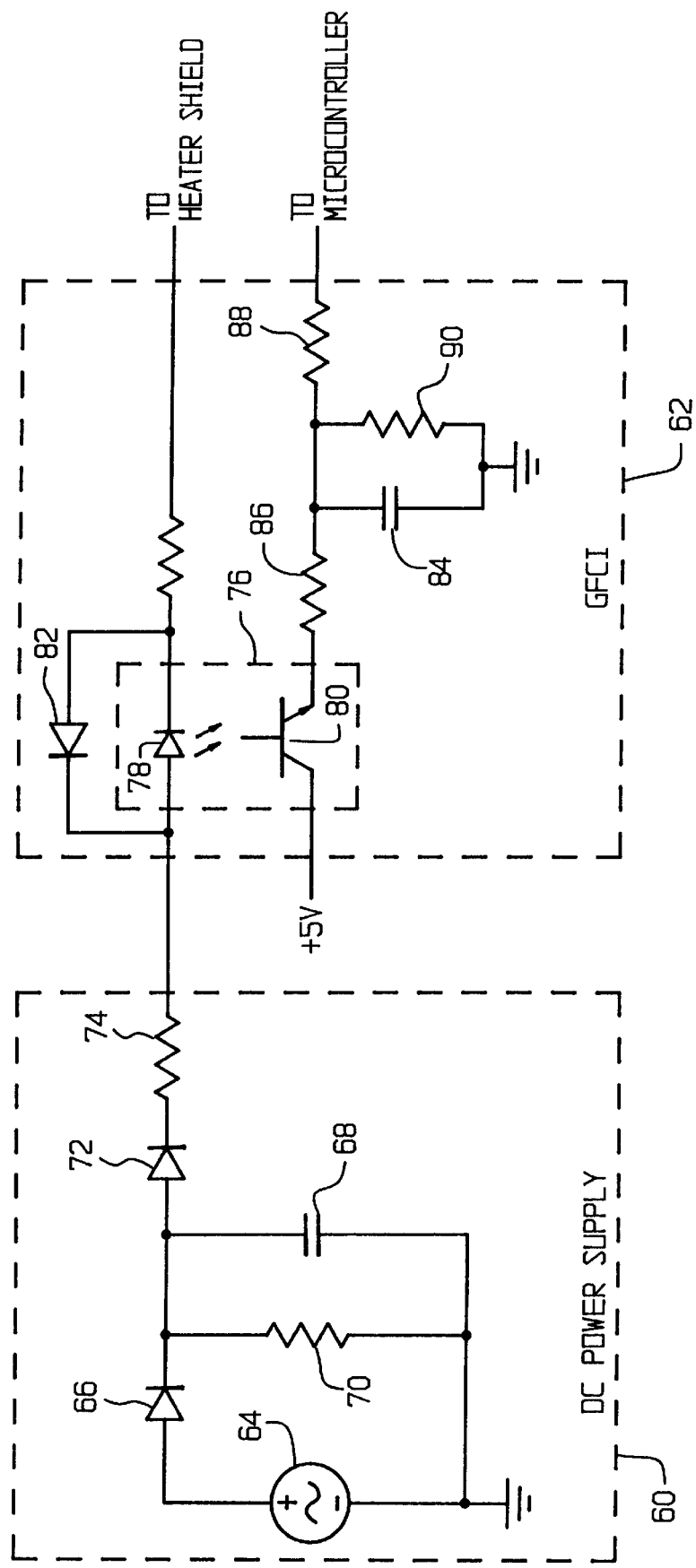
FIG. 6 is a schematic diagram of the ground fault circuit interrupter of FIG. 5.

DC voltage supply 60 and GFCI 62 are shown in more detail in FIG. 6. DC voltage supply 60 includes an AC voltage supply 64 whose AC voltage is rectified and converted into a DC voltage. Diode 66 is a half-wave rectifier. Capacitor 68 charges to approximately the peak value of AC voltage supply 64. Resistor 70 discharges capacitor 68, thus eliminating a shock hazard that could occur when the supply voltage is not applied, such as when the snow and ice melting system is turned off. Diode 72 prevents reverse current flow in the event that heater shield 31 is inadvertently shorted to another voltage source, thus ensuring proper operation. Resistor 74 limits the current that can flow through heater shield 31, possibly to less than four milliamperes.

GFCI 62 includes an opto-isolator 76 which senses DC current flow and transmits an optical signal indicative thereof with a light emitting diode (LED) 78. Opto-isolator 76 also includes a photo-transistor 80 which receives the optical signal from LED 78 and transmits a signal indicative thereof to microcontroller 20. Opto-isolator 76 can have a current transmission ratio of 100% or greater. Thus, a current of 10 milliamperes through LED 78 can produce a current of 10 milliamperes in photo-transistor 80. In this circuit, the saturation current of photo-transistor 80 is approximately 0.5 milliamperes. Diode 82 protects LED 78 from at destructive reverse voltage transients.

If heater insulation 33 fails, creating a current path between heater shield 31 and heater wire 27, the DC current in heater shield 31 increases through a threshold value. Photo-transistor 80 then charges a capacitor 84 through a current-limiting resistor 86 in order to reduce electrical noise. The voltage of capacitor 84 is applied to microcontroller 20 through line 34 and current-limiting resistor 88. Current-limiting resistor 88 limits the worst-case discharge current into line 34 and microcontroller 20 to a safe value. An optional resistor 90 can be used to discharge capacitor 84 when photo-transistor 80 turns off.

It is possible for AC voltage supply 43, in addition to supplying heater power to heater wire 27, to function in the place of AC voltage supply 64. It is also possible for DC voltage supply 60 to be in the form of a DC voltage battery.

Where in this application the terms "ground fault circuit interrupter", "GFCI" or the like are used, it is to be understood that such terms may encompass a more generic type of current detecting device. That is, the leakage current detected by the GFCI may not necessarily pass directly to "ground", or to a grounded device. Rather, the current detected by GFCI 62 can flow from shield 31 to heater wire 27, with heater wire 27 being otherwise electrically connected only to AC voltage source 43.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An ice and snow melting system, comprising:
   at least one sensor, each said sensor being configured for sensing one of temperature and moisture associated with an ambient environment and providing a signal indicative thereof;
   a heater for melting the ice and snow, said heater including a heater wire, a layer of insulation substantially surrounding said heater wire, and a conductive shield substantially surrounding said layer of insulation;
   a ground fault circuit interrupter, said ground fault circuit interrupter coupled with said shield of said heater, said ground fault circuit interrupter detecting a ground fault condition between said heater wire and said conductive shield and providing a signal indicative thereof;
   a DC power supply configured for applying a DC voltage to said conductive shield one of directly and via said ground fault circuit interrupter; and
   an automatic controller connected to said at least one sensor, said controller including heater control circuitry receiving each of said sensor signal and said ground fault circuit interrupter signal and selectively controlling operation of said heater dependent upon said sensor signal and said ground fault circuit interrupter signal.

2. The ice and snow melting system of claim 1, wherein said ground fault circuit interrupter includes a DC current sensor configured for detecting a DC current associated with said DC voltage in said conductive shield.

3. The ice and snow melting system of claim 2, wherein said DC current sensor includes an opto-isolator with a light emitting diode and a photo-transistor.

4. The ice and snow melting system of claim 3, wherein said opto-isolator has a current transmission ratio of approximately 100%.

5. The ice and snow melting system of claim 3, wherein said photo-transistor has a saturation current of approximately 0.5 milliamperes.

6. The ice and snow melting system of claim 3, wherein said ground fault circuit interrupter includes a diode configured for protecting said light emitting diode from reverse voltage transients.

7. The ice and snow melting system of claim 6, wherein said protecting diode is connected in parallel with said light emitting diode.

8. The ice and snow melting system of claim 1, wherein said conductive shield is ungrounded.

9. An ice and snow melting system, comprising:
   a heater for melting the ice and snow, said heater including a heater wire, a layer of insulation substantially surrounding said heater wire, and a conductive shield substantially surrounding said layer of insulation;
   a DC power supply configured for applying a DC voltage to said conductive shield; and
   a current detecting device coupled with said conductive shield and configured for detecting a DC current associated with said DC voltage in said conductive shield, said DC current flowing from said conductive shield to said heater wire.

10. The ice and snow melting system of claim 9, further comprising an automatic controller including heater control circuitry, wherein said current detecting device is configured to provide an interrupter signal indicative of said DC current in said conductive shield, said heater control circuitry of said controller receiving said interrupter signal and selectively controlling operation of said heater dependent upon said interrupter signal.

11. The ice and snow melting system of claim 9, wherein said DC power supply includes an AC power supply configured for applying an alternating current voltage to said heater wire.

12. The ice and snow melting system of claim 9, wherein said conductive shield is ungrounded.

13. A method of controlling a heater used to melt ice and snow, said method comprising the steps of:
   providing the heater with a heater wire, a layer of insulation substantially surrounding said heater wire, and a conductive shield substantially surrounding said layer of insulation;
   providing heater control circuitry for selectively controlling operation of the heater;
   sensing one of temperature and moisture associated with an ambient environment with a sensor and providing a signal indicative thereof with said sensor;
   transmitting said sensor signal to said heater control circuitry;
   applying a DC voltage to said conductive shield without first applying the DC voltage to said heater wire;
   detecting a DC current associated with said DC voltage in said conductive shield;
   transmitting a signal indicative of said DC current associated with said DC voltage to said heater control circuitry; and
   selectively controlling the operation of the heater with said heater control circuitry, dependent upon at least one of said sensor signal and said signal indicative of said DC current.

14. The method of claim 13, wherein said controlling step comprises controlling the operation of the heater with said heater control circuitry, dependent upon each of said sensor signal and said signal indicative of said DC current.

15. The method of claim 13, wherein said conductive shield is ungrounded.

16. A method of controlling a heater used to melt ice and snow, said method comprising the steps of:
   providing the heater with a heater wire, a layer of insulation substantially surrounding said heater wire, and an ungrounded conductive shield substantially surrounding said layer of insulation;
   applying a DC voltage directly to the conductive shield;
   detecting a DC current associated with said DC voltage in the conductive shield; and
   selectively controlling the operation of the heater dependent upon said detecting step.

17. The method of claim 16, wherein said detecting step includes using a ground fault circuit interrupter.

18. The method of claim 17, wherein said ground fault circuit interrupter includes a current sensor.

19. The method of claim 17, comprising the further steps of:
   providing heater control circuitry for selectively controlling operation of the heater;
   using said ground fault interrupter to provide a signal indicative of a ground fault condition associated with the heater; and
   transmitting said ground fault circuit interrupter signal to said heater control circuitry.

* * * * *